United States Patent
Seroul et al.

(10) Patent No.: US 11,989,083 B2
(45) Date of Patent: May 21, 2024

(54) METHOD AND DEVICE FOR DETERMINING AT LEAST ONE MACHINE INVOLVED IN AN ANOMALY DETECTED IN A COMPLEX COMPUTING INFRASTRUCTURE

(71) Applicant: BULL SAS, Les Clayes-sous-bois (FR)

(72) Inventors: Pierre Seroul, Sinard (FR); Emeric Dynomant, Grenoble (FR); Maxence Menager, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 229 days.

(21) Appl. No.: 17/584,280

(22) Filed: Jan. 25, 2022

(65) Prior Publication Data

US 2022/0237070 A1    Jul. 28, 2022

(30) Foreign Application Priority Data

Jan. 25, 2021   (EP) .................................... 21305087

(51) Int. Cl.
*G06F 11/07* (2006.01)
*G06F 11/30* (2006.01)
*G06F 11/34* (2006.01)

(52) U.S. Cl.
CPC ........ *G06F 11/0781* (2013.01); *G06F 11/079* (2013.01); *G06F 11/3006* (2013.01); *G06F 11/3476* (2013.01)

(58) Field of Classification Search
CPC ............. G06F 11/3466; G06F 11/3447; G06F 11/3452; G06F 11/0766; G06F 11/079; G06F 11/0781

See application file for complete search history.

(56) References Cited

U.S. PATENT DOCUMENTS

| | | | |
|---|---|---|---|
| 9,355,007 B1* | 5/2016 | Eicher | G06F 11/0751 |
| 10,733,514 B1* | 8/2020 | Savir | G06F 11/3476 |
| 2020/0073778 A1* | 3/2020 | Ikeda | G06F 11/3452 |
| 2020/0183769 A1* | 6/2020 | Poghosyan | G06F 11/0751 |
| 2021/0357282 A1* | 11/2021 | Verma | G06N 3/044 |
| 2021/0382770 A1* | 12/2021 | Lu | G06V 30/1988 |
| 2021/0406112 A1* | 12/2021 | Moss | G06F 11/0751 |

FOREIGN PATENT DOCUMENTS

EP      3489831 A1    5/2019

OTHER PUBLICATIONS

European Search Report issued in EP21305087.5, dated Jul. 30, 2021 (6 pages).
Borghesi, et al., "Online Anomaly Detection in HPC Systems", 2019 IEEE International Conference on Artificial Circuits and Systems; Mar. 18, 2019; pp. 229-233.

* cited by examiner

*Primary Examiner* — Yolanda L Wilson
(74) *Attorney, Agent, or Firm* — ARC IP Law, PC; Joseph J. Mayo

(57) ABSTRACT

A method for determining at least one machine involved in an anomaly detected in a computing infrastructure comprising a plurality M of machines. This determination is performed by associating with each machine a state vector constructed using metrics and logs. Each vector is also associated with a time window. The monitoring of these vectors makes it possible to detect an anomaly that is then explained via an explanation method that makes it possible to assign an involvement indicator to each machine. The use of this indicator makes it possible to determine the machine most involved.

11 Claims, 2 Drawing Sheets

METHOD AND DEVICE FOR DETERMINING AT LEAST ONE MACHINE INVOLVED IN AN ANOMALY DETECTED IN A COMPLEX COMPUTING INFRASTRUCTURE

This application claims priority to European Patent Application Number 21305087.5, filed 25 Jan. 2021, the specification of which is hereby incorporated herein by reference.

BACKGROUND OF THE INVENTION

Field of the Invention

The technical field of the invention is that of complex computing infrastructures.

One or more embodiments of the invention is a method and device for determining at least one machine involved in an anomaly detected in a complex computing infrastructure.

Complex infrastructure means High Performance Computing, also known as HPC, or company server parks. Such infrastructures are also called computing clusters. Such infrastructures are complex as the number of machines they comprise amounts to thousands in some cases. Machine or compute node is herein referred to interchangeably.

One or more embodiments of the invention relates to anomaly analysis and in particular determining the machine or machines responsible for the appearance of an anomaly.

Description of the Related Art

"High Performance Computing" (HPC) computers or company server parks are complex systems facilitating the parallelization of related sub-tasks for a given service. Incidents on this type of equipment are very detrimental to end users (slow and complicated reboot, increased energy consumption, loss of services, etc.) and their prediction/detection enables the administrative team to anticipate or improve the resolution of these problems.

Solutions such as CDC for "Cognitive Data Center" are known. This particular solution is described on the following website https://atos.net/fr/solutions/codex-ai-suite. Such a solution makes it possible to implement incident detection/prediction pipelines on this type of equipment. By using system metrics (use of processors, RAM, disk read/writes, energy consumption, etc.) or logs (systems, applications, etc.), the anomalies can be detected in real time and reported to administrators.

In computing, a log corresponds to a logging of the activity of a process. This log, or journal, is created by sequentially recording in a file or a database all or part of the activity of the process. A log or journal refers to the file in which these records are saved. These records are dated. For a given log file, different lines can have different semantics. In practice, the term "log" is used to refer to a file/journal of logs or a log line. A log line is a line in a file/journal of logs.

And yet, such detection only really makes sense for an end user where it can lead to the resolution of the problem, or as a minimum its accurate identification. General information such as "the cluster will be subject to an incident" is in fact considerably less pertinent than more specific information such as "node X of the cluster is deviating from its nominal behavior".

In the prior art, no system makes it possible to simultaneously process, within the same detection model, heterogeneous data (digital, textual or topological) such as for example the logs, the metrics and the network infrastructure.

And yet, systemic failures can only be detected by simultaneous analysis of all of the information.

In the prior art, it is also noted that the objectives of sensitivity (use of all the metrics available) and of specificity are, a priori, opposed. It is important to use as many information sources as possible to maximize the chance of detection, however information is diluted as the number of sources increases and this makes it difficult to identify the causes of the incident.

The solutions proposed in the prior art often focus not on the detection of incidents on the machine, but on the monitoring of the performances thereof. Thus, a technical operator is required to monitor the constants of the equipment and to react accordingly. It is noted that in the field of the invention, the term "monitoring" is used to refer to surveillance.

For example, the "Nagios" solution is known, which is a generic system monitoring tool, and can be viewed on the website https://www.nagios.org/. It is focused exclusively on the system metrics. One of the difficulties associated with Nagios is that its predictive capabilities are based on extension modules, also called plugins, developed by the community. There is therefore very little tracking of versions, relatively scarce documentation, unsophisticated anomaly detection techniques such as threshold exceedance or decorrelation, etc.

The Zabbix solution is also known, which is another monitoring software that can be viewed on the website https://www.zabbix.com/. Like Nagios, it only focuses on metrics and relies on its library of plugins to offer anomaly detection possibilities.

Although they are very popular, the primary purpose of these solutions is not to detect anomalies but instead it is unified monitoring of the metrics of a complex system. New players have recently emerged with native anomaly detection possibilities via learning algorithms but which are still based on system metrics and not on logs.

However, a few other solutions use logs as an input to their algorithms. For example, the Zebrium solution (viewed on the website https://www.zebrium.com/) detects changes in the seasonality or frequency of appearance of certain log patterns. However, this solution is only interested in a single machine being studied and therefore does not take into account the possibility of monitoring a park of servers hosting a single application or a HPC system comprising several compute nodes.

The "Log Anomaly Detector" solution is a set of tools found on a GitHub repository affiliated with RedHat. This "open source" solution uses modern techniques to represent logs. Focused on single machines, it classifies logs into two classes (positive and negative) and raises an incident when the proportion of negative logs increases.

Other solutions have not been implemented formally but are simply described in scientific journals. This field of study is relatively recent.

In 2017, Dani et al. ("K-means Application for Anomaly Detection and Log Classification in HPC") detected anomalies by virtue of a clustering algorithm using a K-means method. The authors used logs to define a "normality" cluster. If many logs escape this "normal" cluster, an anomaly is thus indicated. However, during incidents affecting for example the file system of a HPC, all nodes will depart from their nominal behavior and the anomaly will become the rule. In the same year, Tuncer et al. ("Diagnosing Performance Variations in HPC Applications Using Machine Learning") proposed supervised learning on metrics to achieve the same result. Furthermore, these systems work by using host node resources, which reduces the performance of host nodes for all of their tasks.

In 2019, Borguesi et al. ("Online Anomaly Detection in HPC Systems") devised a system installed directly on node control boards (a technology known as "edge computing") in order to reduce the impact on the overall performance. Using only metrics, this is the first system found that reports an anomaly score for each cluster node.

Very little academic work reports the use of logs for anomaly detection. However, it should be noted that in 2020, Farzad et al. ("Unsupervised log message anomaly detection") used log models in 2020, followed by the frequency of appearance of each model in order to detect anomalies in a single log stream. However, the detection was based on an initial "positive/negative" classification of each log. Therefore, considerable classification work was performed beforehand on the logs.

BRIEF SUMMARY OF THE INVENTION

One or more embodiments of the invention offers a solution to the problems outlined previously, by enabling out-of-band management to be implemented without computing resources being consumed in the complex computing infrastructure. According to one or more embodiments of the invention, "out-of-band" is understood to be the act of not using infrastructure work resources but using resources dedicated to managing the infrastructure.

One or more embodiments of the invention relates to a method for determining at least one machine involved in an anomaly detected in a computing infrastructure comprising a plurality M of machines, M being an integer strictly greater than 1, said method being characterized in that it comprises the following steps implemented automatically:
  Configuration of a state vector structure of dimension N of a machine, N being an integer strictly greater than 2, said structure distributing metric-like information and log-like information in the N dimensions;
  Determination of a time window duration;
  Acquisition of timestamped operating data according to the configuration of the state vector and of the time window duration;
  Construction of a state vector, for each of the M machines from the timestamped data acquired, according to the state vector structure configured, said construction comprising the following steps:
    Digitization of the data acquired according to the configuration of the state vector;
    Normalization of the digitized data;
    Aggregation of data by dimension;
  Assembling M vectors of dimension N into an infrastructure vector;
  Detection of an anomaly by applying an anomaly detection method to the infrastructure vector;
  For the anomaly detected, the method further comprises the following additional steps:
    Application of an explanation method to the infrastructure vector producing an infrastructure explanation vector comprising M machine explanation vectors of dimension N;
    Separation of the explanation vector for each machine;
    For each machine, aggregation of the components of the explanation vector to obtain an involvement indicator;
    Determination of the machine having the highest indicator, said determined machine then being considered as involved in the anomaly.

By virtue of one or more embodiments of the invention, a more comprehensive approach is obtained that addresses the shortfalls of the prior art. A "more comprehensive approach" is understood herein to be an approach that takes into account all of the information available for the infrastructure.

Firstly, the method according to one or more embodiments of the invention uses logs in combination with metrics as part of a joint representation of these heterogeneous data. Indeed, the vast majority of known studies or projects only use one or the other of these types of data. And yet, they are two sides of the same coin: if a machine in a server park causes an anomaly, its logs should indicate this as well as its system metrics.

Then, the method according to one or more embodiments the invention makes it possible to preserve the deep semantics of the log. In fact, developers provide numerous elements in their log messages depending on the various levels (info, debug, warning, error, etc.). A typical log line comprises: timestamp, level, application, machine, message. The message itself may be structured or uses natural language. It is not possible for a simple model extraction to reflect this complexity. This preservation is obtained by the digitization mode of the logs.

Furthermore, the method according to one or more embodiments the invention is capable of detecting anomalies at a whole cluster, or a park of servers dedicated to the same application. In fact, this detection makes more sense when it is considered on an operational level: a set of machines is often responsible for a specific task, with a wider application. It is this comprehensive application that is critical and the halting thereof would be detrimental. one or more embodiments of the invention makes it possible to understand a set of machines as a single application.

Furthermore, on a professional level, one or more embodiments of the invention makes it possible to trace back to the machine that is the source of the problem. Once the parent application has crashed, the problem resolution time will be quicker than the identification thereof: knowing which machine is responsible appears to be the first question to answer before launching the RCA ("Root Cause Analysis") best targeted to this equipment. Such an outcome is also obtained by one or more embodiments of the invention.

One or more embodiments of the invention thus makes it possible to both obtain a unique indicator of the behavior of the infrastructure but also to identify the machine or machines responsible when this behavior is detected as being abnormal, without requiring or using the computing power of the host machine and being sufficiently scalable for use in production.

In addition to the features mentioned in the preceding paragraph, the method according to one or more embodiments of the invention may have one or more complementary features from the following, taken individually or according to all technically plausible combinations:
  The operating data acquired comprise metrics and lines of at least one activity log file;
  Log-like information may be digitized using a method selected from the following methods: Word2VEC, BERT, GloVe;
  The digitized operating data may be aggregated using, on said data, a method selected from the following: mean, quartile, minimum, maximum;
  The time window has a duration of between one minute and one hour;
  The time window has a duration of between one minute and ten minutes;

A state vector has a dimension N between fifty and one hundred;

A state vector has a dimension N such that the product N×M of the dimension multiplied by the number of machines does not exceed one million;

The anomaly detection method, applied to the infrastructure vector, may be selected from one of the following methods: autoencoder and elliptic envelope, "isolation-forest", OCSVM;

The explanation method, applied to the infrastructure vector, may be selected from the following methods: Shap, Lime, neural network attention layer;

Components of the explanation vectors are aggregated using, on said components, a method selected from the list formed of at least: mean, quartile, minimum, maximum;

Another aspect of one or more embodiments of the invention relates to a computer program product comprising instructions that, when the software is executed on a computer, make the latter implement steps of a method according to any combination of the features previously cited.

Another aspect of one or more embodiments of the invention relates to a recording medium on which a computer program is recorded for determining at least one machine most directly involved in an anomaly detected in a computing infrastructure according to the previous paragraph.

One or more embodiments of the invention and its different applications will be better understood upon reading the following disclosure and examining the accompanying figures.

DETAILED DESCRIPTION OF THE INVENTION

In this description, when an action is allocated to a device, this action may be performed by the computing means of said device implementing instruction codes, also called executable codes, saved in a storage memory of said device. Similarly, when a device communicates, this means that it transmits and/or receives messages via a communication interface. These messages are produced and/or processed by the computing means of said device.

It is also possible to allocate an action to an application, or to a software. Application or software means any expression, code or notation, of a set of instructions intended to cause data processing to perform a particular function, directly or indirectly (e.g. after a conversion operation to another code). Examples of program code can include, but are not restricted to, a sub-program, function, executable application, source code, object code, library and/or any other sequence of instructions designed to be executed on a computing system.

Figure 1:
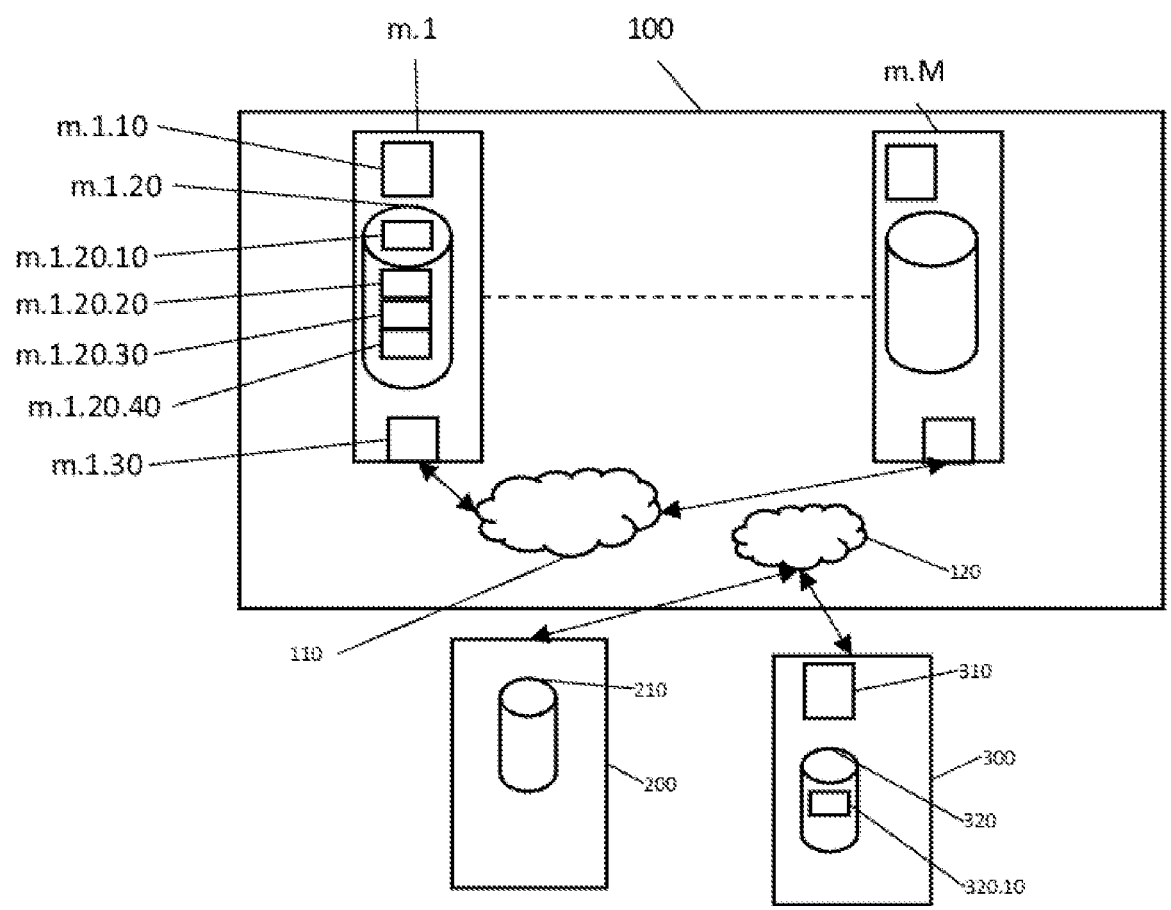
FIG. 1 a schematic representation of complex computing infrastructure.

FIG. 1 shows a functional schematic representation of a complex computing infrastructure 100. A complex computing infrastructure can be a data center, supercomputer, network of company servers . . . this list is not exhaustive. A complex infrastructure is characterized, inter alia, by the number of machines it comprises. In such an infrastructure, the number of machines amounts to thousands and even several tens of thousands.

Depending on the context, the machines can be called machines, servers, nodes, blades.

It is noted that one or more embodiments of the invention may be used with infrastructures comprising fewer machines.

Unless otherwise stated, the same element appearing in different figures has the same reference.

FIG. 1 shows that the complex computing infrastructure 100 comprises:

A plurality of machines, herein M machines, the order of magnitude of M having already been defined. The machines are designated by m.i with i being an integer varying from 1 to M. The machines are functionally identical. In an illustrative example, let us consider that M is ten thousand.

An interconnection network 110 that enables M machines to communicate with each other.

A maintenance network 120 that enables a supervisor, to communicate with the M machines via communication interfaces not shown.

It is possible that the interconnection network may also be used as a maintenance network.

FIG. 1 shows that the machine m.1 comprises:

Computing means m.1.10, for example a microprocessor, microcontroller, dedicated circuit, etc.; this list is not exhaustive;

Storage means m.1.20: for example a hard drive, SSD, network drive, etc.; this list is not exhaustive. The storage means are represented in a unified way but it may consist of several logic units distributed over several physical devices.

A communication interface m.1.30 compatible with the interconnection network 110 of the complex computing infrastructure 100. Such an interface is, for example, an Ethernet interface, of the "fiber channel" type, or any other interface suited to complex computing infrastructures.

FIG. 1 shows that the storage means m.1.20 of machine m.1 comprises several zones among which:

A zone m.1.20.10, known as an instruction code zone, comprising instruction codes implemented by the computing means m.1.10 of machine m.1. This instruction code zone includes an operating system and applications;

A zone m.1.20.20, known as a sensor zone, comprising instruction codes making it possible to produce metrics or inputs for the log files. In practice, these instruction codes are: included in the operating system and/or included in the applications and/or added via software connectors that exist in the operating system and/or the applications.

A zone m.1.20.30 for storing metric values;

A zone m.1.20.40 for storing log files.

Emphasis is placed herein on the difference between metrics and the activity log file. Indeed, the metrics can be logged, which could result in them being considered as forming part of the activity logs. A metric gives information about the state of a hardware or software component of a machine, for example the drive access number. This metric can be given for each process, for example the drive access number for the process for which the pid ("process identifier") is 12584. A metric, or metric-like information, therefore associates a date and a value, the interpretation of the value being performed by the nature of the metric.

On the contrary, a line in a log file, or log-like information, is, for example:

2018-07-11 13:20:56 192.168.1.150 GET/favicon.ico-80-192.168.1.106 Mozilla/5.0+(Windows+NT+10.0;+Win64;+x64;+rv:61.0)+Gecko/20100101+Fi refox/61.0-200 0 0 15.

In this line, the pieces of information are separated by spaces. This line tells us, inter alia, on what date and at what time, and with which method, a file called favicon.ico was requested. This line also tells us that the response was issued in 15 ms. Such a line is therefore considerably more informative than a simple metric. There are numerous activity logs with varying degrees of verbosity and containing various information. This information is sometimes left to the imagination of the developers. One or more embodiments of the invention enables this type of information to be processed in its anomaly detection. One or more embodiments of the invention therefore makes it possible to process application logs whose format is: unknown a priori and/or not standardized at the operating system. Herein, by non-standardized, the content is targeted more than the format. However, it is noted that one or more embodiments of the invention processes both logs that are non-standard in their format, that is in their structure, as well as standard logs. This is all the more pertinent when the format of the log is defined by the user at the time the application that produces said log is configured. From one implementation of the product to another, the format of the log is therefore not stable. One or more embodiments of the invention makes it possible to adapt to this situation.

FIG. 1 shows a state machine 200 connected to the maintenance network of the complex computing infrastructure 100. Functionally, the state machine 200 comprises a database 210 which enables the timestamped recording of log files and metrics produced by the machines of the complex computing infrastructure. Among the existing collection systems, LogStach or Kibana can be cited as examples.

Such a complex computing infrastructure connected to a state machine is well known to the person skilled in the art.

FIG. 1 shows an analysis machine 300, functionally identical to machines previously described, comprising:
    Computing means 310;
    Storage means 320 comprising at least one zone 320.10 comprising instruction codes for implementing the method according to one or more embodiments of the invention.

FIG. 1 shows that the analysis machine 300 is connected to the maintenance network 120 of the complex computing infrastructure 100. This enables the analysis machine 300 to read the data saved in the database 210 of the state machine 200. In practice, there are at least two other possibilities to enable the analysis machine 300 to read the data saved in the database 210:
    There is another network, not shown, enabling the state and analysis machines to communicate;
    The analysis machine is connected such that it can read the information at the source, that is directly on the machines of the complex infrastructure.

Figure 2:
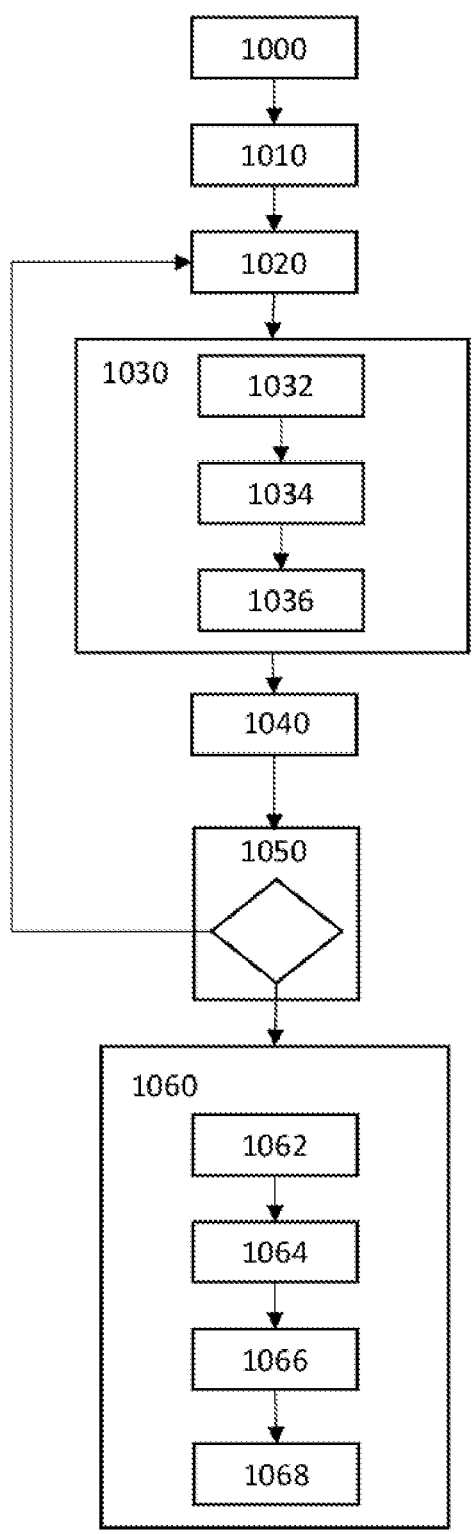
FIG. 2 An illustration of steps of the method according to one or more embodiments of the invention.

FIG. 2 shows a preliminary step 1000 for configuring a state vector structure of dimension N. N is an integer strictly greater than 2. In fact, at least 2 dimensions are needed to use log-like information and metric-like information. This is a configuration step of the method according to one or more embodiments of the invention. According to one or more embodiments of the invention, a state vector describes a machine using N numerical values. Configuring a state vector involves choosing the following parameters:

Which dimension N for the state vector: one or more embodiments of the invention is particularly suited to a dimension between 50 and 100. In the example, 70 has been chosen. These numbers depend on the computing power available to perform the analysis. They correspond to a 10th generation i5 processor with 8 GB of RAM. It is therefore possible to have over 100 dimensions with greater computing power;

How the dimensions are distributed between the metrics and the log files. For example, 20 dimensions are taken for the log files and 50 for the metrics;

Which log journals are used to supply the dimensions corresponding to the log files. Generally, it is accepted that there is one file per application. One or more log files can be assigned to one or more dimensions. In one example, each log selected contributes to all the dimensions corresponding to the log files. It is possible to use all or part of a log file, for example by filtering the message level.

Which method to use to digitize the log file lines;

Which metrics to use to supply the dimensions corresponding to metrics in the state vector. Conventional metrics are, for example: CPU frequency (Hz), RAM used (GB), hard drive read access number, SWAP memory used (GB), CPU temperature (° C.), CPU power consumption (W). The list is not exhaustive. A more exhaustive list can be viewed, for example, by configuring a performance analysis on a machine using the "Windows" operating system. This list thus corresponds to performance counters. Another list can be obtained via the default configuration of "Telegraf" system monitoring tools.

The methods that can be used to digitize a line of a log file include at least:
    Word2VEC,
    BERT, and
    GloVe.

Each of these methods makes it possible to convert a word, or a phrase, to a vector, the dimension of which depends on the configuration of the method chosen. In the example in the description, the method is configured to produce a vector of dimension 20 in accordance with the distribution of the dimensions of the state vector.

According to the implementation of one or more embodiments of the invention, the entire line is digitized, without the timestamped information which may be contained therein, or only certain parts of the line. It is reminded that conventionally a line of a log file is composed of several fields separated by a delimiter character. It is therefore easy to designate a field by its rank in the line. Log entries are also found in json or xml format. This remains functionally identical to a line with a delimiter.

In one variant of one or more embodiments of the invention, a graphical depiction is used to perform digitization. In this variant, the complex computing infrastructure is depicted as a graph and this is used to obtain a joint representation of the two types of data. For example, the log files are the vertices of the graph, the metrics are the attributes of the machine vertices.

FIG. 2 shows a step 1010 for determining a time window. This is a configuration step of the method according to one or more embodiments of the invention. In one or more embodiments of the invention, time windows of approximately one minute are considered. In this step, the duration is set for the time window which will be considered by the method according to the invention in subsequent steps. According to one or more embodiments of the invention, this duration is:

Less than or equal to ten minutes, or
Less than or equal to one hour.

It is noted that one or more embodiments of the invention may be implemented with time windows having a greater duration but this delays the predictions accordingly. It is necessary to wait for the end of the window in order to have the result of the analysis.

FIG. 2 shows a step 1020 for acquiring timestamped operating data. It is recalled that the operating data comprise at least metrics and content taken from the activity log files.

In one or more embodiments of the invention, the operating data are acquired in the state database 210. From a functional viewpoint, this database makes it possible to retrieve these data via structured records, each record comprising at least:

A time marker also called a "timestamp" that is equivalent to a date comprising at least information about the year, month, day, hour, minute and second. Often, such a date also comprises millisecond information. It is, for example, the number of seconds elapsed since the first of January 1970 at midnight UTC. For one or more embodiments of the invention, a minute-specific time marker is sufficient;

An identifier of a machine from which the information originates;

An identifier of the information. If it is a metric, then it is an identifier of the metric. If it is a line in a log file then, for one or more embodiments of the invention, an identifier qualifying the nature of the information such as a log file line suffices;

A value for the information.

To retrieve these data, the database is consulted based on the time window, then these data are grouped together by machine and by dimension.

We then proceed to step 1030 for constructing a state vector. This construction comprises the following sub-steps:

Digitization 1032 of data acquired according to the configuration steps;
Normalization of digitized values;
Aggregation of normalized values.

It is noted that the normalization can be performed on the result of the aggregation.

The aggregation is performed on the duration of the time window. Aggregation can be exclusive or rolling. Exclusive means that each data item belongs to a single time window. In the exclusive case, there is a first time window going from one date d1 to a date d2 equal to d1 plus the duration of the time window. A following second time window goes from d2 to d2 plus the duration of the time window. In a rolling variant, two successive time windows can overlap each other.

According to the variants of one or more embodiments of the invention, aggregation can be performed by at least one of the following methods: mean, quartile, minimum, maximum . . . . This list is not exhaustive. Selecting one of these methods forms part of a configuration of the method according to one or more embodiments of the invention.

The normalization step makes it possible to have a homogeneous vector, that is with the values of all of its dimensions within a given interval, for example the interval [−1;1] or even the interval [0;1]. In particular, this normalization must be performed on the metrics so that they are of the same magnitude as the outputs of the digitization method of the log file lines. Normalization is performed based on statistical values on a set of data viewed when training the model, or based on a known magnitude dynamic.

Once all the M state vectors are available for a time window, it is then possible to proceed to a step 1040 for assembling M state vectors of the machines in order to obtain a state vector of the infrastructure.

It is then possible to proceed to step 1050 for detecting an anomaly. In this step, the state vector is used as an input for an anomaly detection method.

In one or more embodiments of the invention, such a method for detecting anomalies is, for example, an autoencoder. Such an autoencoder will have first been trained on a set of data corresponding to the normal operation of the computing infrastructure. This set of data corresponds to the longest possible period, for example 18 months. However, one or more embodiments of the invention remains applicable even in the event of a shorter period, for example a week of data.

For detection, the output of the autoencoder is subtracted at its input and the result of this subtraction is subjected to an elliptic envelope to determine if there are one or more abnormal values in the output of the autoencoder.

The sensitivity of the method according to one or more embodiments of the invention can be adjusted for example, based on the value number required to be anomalous. The sensitivity can also be adjusted over the distance from which the points move away from the envelope.

If an anomaly is detected, for example if at least one point exits the envelope, that is abnormally located for the detection method chosen, then we proceed to a step 1060 for processing the detected anomaly. Otherwise we return to step 1020 for acquiring data in order to start processing another time window. When processing the anomaly, we may also talk about detection accuracy.

It should be noted herein that with parallel processing, and multicore processors, it is possible to simultaneously process a time window and a detected anomaly.

After the detection step, there is a benefit with respect to the prior art. Indeed, we are able to detect an anomaly by taking into account both the metrics and the log files.

One advantage of this detection is that it is not supervised, that is that it does not require prior analysis of data. Other detection methods may be used with one or more embodiments of the invention. For example, the following algorithms which it is possible to implement to perform this detection may be cited:

"isolation forest";
OCSVM which is the acronym for "One Class Support Vector Machine".

Step 1060 for processing anomalies comprises a step 1062 for explaining the anomaly. In the anomaly explanation step 1062, an explanation method is used, selected from the list comprising at least the following algorithms:

Shap;
Lime;
Neural network attention layer.

The list in the previous paragraph is not exhaustive.

By virtue of the detection step, the output points to be observed are in fact known: it is those which are anomalous. To determine the input points that could have caused this anomaly, it is therefore possible to use one of the aforementioned explanation methods.

At the end of the explanation process, an infrastructure anomaly explanation vector is obtained. This vector has the same structure as the infrastructure state vector: M vectors of dimension N.

We then proceed to a step 1064 for separating the infrastructure explanation vector into M machine explanation vectors. The term deconcatenation is also used. This is a symmetrical step to the assembly step 1040.

We then proceed to a step 1066 for calculating an involvement indicator for each machine. This calculation is performed by aggregating, for each machine, the components of the explanation vector. This aggregation is performed, for example, using a method chosen from the list comprising at least: mean, quartile, minimum, maximum. This list is not exhaustive. This selection forms part of a configuration of the method according to one or more embodiments of the invention.

At the end of the step 1066 for calculating an involvement indicator, an indicator is available for each machine, we then proceed to a step 1068 for determining the machine most directly involved in the anomaly. With one or more embodiments of the invention, these indicators can be compared with each other.

According to variants, in step 1068, the machine most directly involved, in other words, which has the highest value, is selected in the following way. The importance of an indicator is measured as being the highest. In other variants of one or more embodiments of the invention, several machines are selected for example by classifying them by indicator value, or by comparing the indicators to a threshold.

In the variant wherein there is a threshold, it is possible that no machine passes the threshold. In this case, there is not an anomaly.

According to one or more embodiments of the invention, it is therefore possible to determine which machine causes an anomalous complex computing infrastructure, taking into account all of the types of information produced by monitoring this infrastructure. These types are the metrics and the activity log files also called log files or logs.

The invention claimed is:

1. A method for determining at least one machine involved in an anomaly detected in a computing infrastructure comprising a plurality M of machines, wherein M is an integer strictly greater than 1, wherein said method comprises:
    configuration of a state vector structure of dimension N of a machine, N being an integer strictly greater than 2, said state vector structure distributing metric-type information and log-type information in N dimensions; determination of a time window duration; acquisition of timestamped operating data according to the configuration of the state vector structure and the time window duration; construction of a state vector, for each of the plurality M of machines from the timestamped operating data that is acquired, according to the state vector structure configured, said construction comprising
        digitization of the timestamped operating data that is acquired according to the configuration of the state vector structure; normalization of the timestamped operating data that is digitized; aggregation of data by dimension;
    assembly of all of each of the state vector of the plurality M of machines of N dimension into an infrastructure vector; detection of an anomaly by applying an anomaly detection method to the infrastructure vector; for the anomaly detected, the method further comprises:
    application of an explanation method to the infrastructure vector producing an infrastructure explanation vector comprising M machine explanation vectors of N dimension; separation of the infrastructure explanation vector per machine; for each machine, aggregation of components of the infrastructure explanation vector to obtain an involvement indicator; determination of the machine having a highest indicator, said machine that is determined then being considered as involved in the anomaly.

2. The method for determining at least one machine involved in an anomaly detected in a computing infrastructure according to claim 1, wherein the timestamped operating data acquired comprises metrics and lines from at least one activity log file.

3. The method for determining at least one machine involved in an anomaly detected in a computing infrastructure according to claim 1, wherein the log-type information is digitized using a method selected from: Word2VEC, BERT, GloVe.

4. The method for determining at least one machine involved in an anomaly detected in a computing infrastructure according to claim 1, wherein the timestamped operating data that is digitized is aggregated using on said data a method selected from: mean, quartile, minimum, maximum.

5. The method for determining at least one machine involved in an anomaly detected in a computing infrastructure according to claim 1, wherein the time window duration is between one minute and one hour.

6. The method for determining at least one machine involved in an anomaly detected in a computing infrastructure according to claim 1, wherein the time window duration is between one minute and ten minutes.

7. The method for determining at least one machine involved in an anomaly detected in a computing infrastructure according to claim 1, wherein a state vector has a dimension N between fifty and one hundred.

8. The method for determining at least one machine involved in an anomaly detected in a computing infrastructure according to claim 1, wherein a state vector has a dimension N such that a product NxM of the dimension multiplied by a number of machines does not exceed one million.

9. The method for determining at least one machine involved in an anomaly detected in a computing infrastructure according to claim 1, wherein the anomaly detection method, applied to the infrastructure vector, is selected from one of: autoencoder and elliptic envelope, isolation forest, OCSVM.

10. The method for determining at least one machine involved in an anomaly detected in a computing infrastructure according to claim 1, wherein the explanation method, applied to the infrastructure vector, is selected from: Shap, Lime, neural network attention layer.

11. The method for determining at least one machine involved in an anomaly detected in a computing infrastructure according to claim 1, wherein the aggregation of the components of the infrastructure explanation vector of each machine is achieved using, on said components, a method selected from: mean, quartile, minimum, maximum.

\* \* \* \* \*